Sept. 14, 1926.  
1,599,839  
J. A. RIGNON  
DEVICE FOR OBTAINING A PRONOUNCED IMPRESSION OF RELIEVO WITH ORDINARY  
CINEMATOGRAPHIC VIEW TAKING AND PROJECTING APPARATUS  
Filed April 18, 1925

Patented Sept. 14, 1926.

1,599,839

UNITED STATES PATENT OFFICE.

JOSEPH ALBERT RIGNON, OF PARIS, FRANCE.

DEVICE FOR OBTAINING A PRONOUNCED IMPRESSION OF RELIEVO WITH ORDINARY CINEMATOGRAPHIC-VIEW TAKING AND PROJECTING APPARATUS.

Application filed April 18, 1925, Serial No. 24,236, and in Germany February 18, 1924.

It is a well known fact that the taking of cinematographic views from a point which moves, such as a moving railway carriage, motor car, boat, etc., provides, when they are projected, an impression of relievo so pronounced that they seem nearly to be stereoscopic views.

On the other hand, as is well known, it has already been proposed to obtain this same impression by giving a constant to and fro motion to the view taking apparatus, either laterally or along its axis or even along a curved line. But experience shows that this method has the great drawback of providing a very unstable and indistinct projection on the screen of the films thus taken. Therefore to avoid this drawback, it is necessary to make special negative films which are printed in a special machine and finally projected by another special machine.

On the contrary, the device which is the object of present invention allows the taking of views with an ordinary apparatus placed in a fixed point and using ordinary films for obtaining pictures which projected by any apparatus, give a pronounced impression of relievo without giving at the same time a wavering impression.

This result is achieved by giving the view taking apparatus a constant to and fro motion along a straight line so as to cause it to move with reference to the scene which is to be photographed along the three directions of space i. e. from right to left, from front to rear and from top to bottom or inversely.

The speed and amplitude of these motions must be calculated carefully so as to make the pictures when projected seem perfectly motionless and quite distinct.

Several forms of execution can be imagined for a device providing for such motions. For instance said device may provide for a to and fro motion along a given line, oblique with reference to the scene which is to be photographed. The movements of the plate carrying the apparatus can be controlled by those of the handle of said apparatus.

A form of execution of a device of this sort is shown diagrammatically by way of example on appended drawings whereof:—

Figure 1:
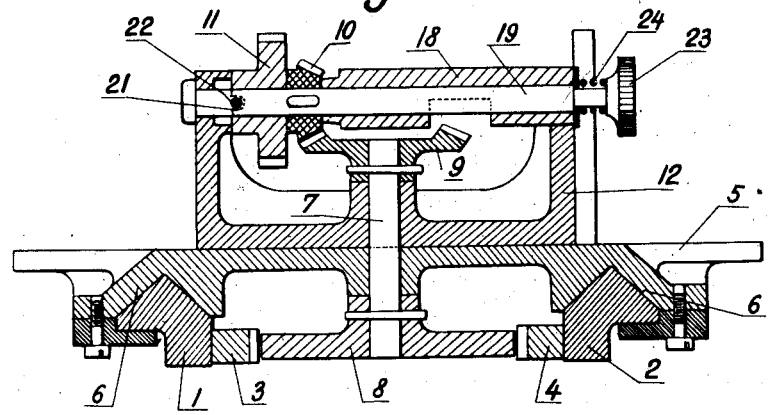
Figure 2:
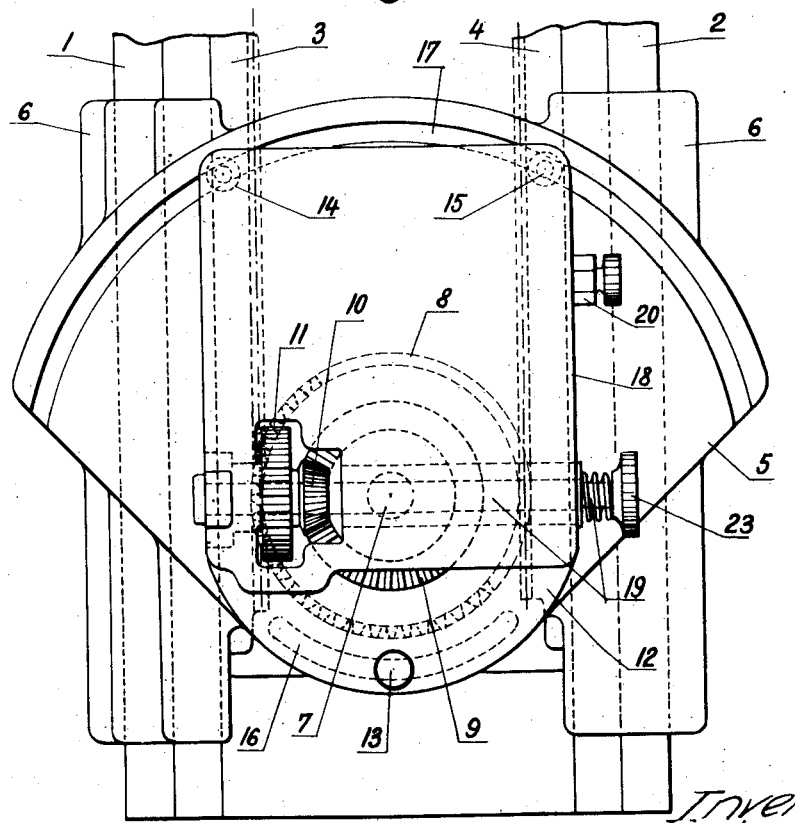

Fig. 1 is a vertical section;
Fig. 2 is a plan view.

On a support (not shown) superior platform of which is oblique with reference to the scene which is to be photographed, are disposed two parallel slides 1 and 2, secured respectively to racks 3 and 4.

A platform 5 can slide along said slides and is provided with guides 6 shape of which is such as will prevent platform from turning and will keep it on the slides. Through this platform passes shaft 7 to which is keyed the wheel 8 provided with teeth on half its periphery so as to be adapted to come into contact with one or the other of the racks 3 and 4.

On top part of shaft 7 is keyed moreover, a second wheel 9, toothed on its whole periphery and engaging a pinion 10 which can be driven by wheel 11 rotation of which is caused through suitable gearwork by the crank of apparatus.

A platform 12 provided with a suitable recess is disposed above platform 5 and bears studs 13, 14 and 15. The latter are provided with set screws and enter circular grooves 16 and 17 provided in platform 5 and center of which is on axis of shaft 7.

A last and third platform 18, situated above the two others and bearing the apparatus can pivot round an axis 19 perpendicular to shaft 7 and disposed in recess of platform 12. This tipping motion is controlled by any suitable device such as 20.

The mechanism is completed by a clutch device which allows the putting out of gear of the whole above described arrangement when it is desired to use the view taking apparatus in the ordinary way. The said clutch device can be constituted in the following manner:

The hub of wheel 11 bears a notch 21 wherein can enter projection 22 borne by shaft 19 on which is keyed pinion 10. A knob 23 terminates this shaft 19 which can slide longitudinally and is subjected to spring 24 which urges it towards the right hand side of the figure so as to hold projection 22 against the bottom of notch 21, thus throwing wheel 11 against pinion 10 whereby the device is thrown in gear.

To throw the device out of gear to use the view taking apparatus in the ordinary way, knob 23 should be pushed so as to disengage projection 22 by compressing spring 24: any stop device can allow the shaft to be fixed in this position.

The working of the device which is the object of invention is the following: the mechanism being in gear and the apparatus disposed on the top platform 18, the slides 2 and 3 are disposed along a line having a certain obliquity with reference to the scene to be photographed; the platform 12 is then hand-rotated by a certain angle with reference to platform 5; lastly platform 18 is tipped by means of device 20 round axis of shaft 19 so as to be substantially perpendicular to the scene to be photographed (that is in most cases horizontal); it is then secured in said position. When this placing is finished, the handle is put in motion: the wheel 11 moving with pinion 10 causes shaft 7 to rotate which latter makes wheel 8 revolve. Wheel 8 engages alternately with racks 3 and 4 and the result is a displacement of the whole along slides 1 and 2 in reciprocating motion. By reason of the obliquity of this line of alternating movement with reference to the scene to be photographed, a displacement of the apparatus with reference to said scene is caused in the three directions: right to left, front to rear, top to bottom or inversely.

What I claim is:—

1. A control device giving cinematographic view taking apparatus a to and fro movement in view of providing a pronounced impression of relievo comprising two parallel stationary slides, two racks disposed opposite each other along the slides, a first platform adapted to slide along said slides, a shaft passing loosely through said platform, a second pivoting platform resting on first platform and through which said shaft passes loosely, a third platform bearing the view taking apparatus, a second shaft by means of which the two last mentioned platforms are hinged together, a bevel gear wheel keyed to said second shaft and controlled by the handle of the apparatus, a second bevel gear wheel keyed to the first shaft and engaging the said first bevel gear wheel and a pinion toothed on one half of its periphery keyed to the first shaft and engaging alternately each rack.

2. A device as claimed in claim 1 comprising means for disconnecting the first bevel gear wheel from the handle of the apparatus.

In testimony whereof I have signed my name to this specification.

JOSEPH ALBERT RIGNON.